US012535843B2

United States Patent

(12) United States Patent
Kondo et al.
(10) Patent No.: US 12,535,843 B2
(45) Date of Patent: Jan. 27, 2026

(54) REFERENCE VOLTAGE GENERATION CIRCUIT

(71) Applicants: DENSO CORPORATION, Kariya (JP); TOYOTA JIDOSHA KABUSHIKI KAISHA, Toyota (JP); MIRISE Technologies Corporation, Nisshin (JP)

(72) Inventors: Masaya Kondo, Nisshin (JP); Yoshikazu Furuta, Nisshin (JP); Tomohiro Nezuka, Nisshin (JP)

(73) Assignees: DENSO CORPORATION, Kariya (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 203 days.

(21) Appl. No.: 18/459,552

(22) Filed: Sep. 1, 2023

(65) Prior Publication Data

US 2024/0077901 A1 Mar. 7, 2024

(30) Foreign Application Priority Data

Sep. 6, 2022 (JP) ................................ 2022-141535

(51) Int. Cl.
*G05F 3/18* (2006.01)
*G05F 1/46* (2006.01)

(52) U.S. Cl.
CPC ................ *G05F 3/18* (2013.01); *G05F 1/468* (2013.01)

(58) Field of Classification Search
CPC ... G05F 3/18; G05F 3/20; G05F 3/205; G05F 3/225; G05F 3/222; G05F 3/247; G05F 3/16; G05F 1/468; G05F 1/54; G05F 1/567; G05F 1/5735; G05F 1/57
See application file for complete search history.

(56) References Cited

U.S. PATENT DOCUMENTS 3,887,863 A * 6/1975 Brokaw .................... G05F 3/30 323/314
8,922,190 B2 * 12/2014 Wu .......................... G05F 1/10 323/314
10,103,050 B2 10/2018 Motz
10,438,835 B2 10/2019 Motz
10,955,868 B2 3/2021 Brule
(Continued)

*Primary Examiner* — Nguyen Tran
(74) *Attorney, Agent, or Firm* — Posz Law Group, PLC

(57) ABSTRACT

A reference voltage generation circuit includes a Zener diode and a current generation circuit connected to the Zener diode in parallel. The current generation circuit includes a resistance voltage divider circuit, a transistor circuit and a voltage control circuit. The resistance voltage divider circuit has a branch portion for branching the current into two paths, and outputs a reference voltage acquired by voltage division through a resistive element. The transistor circuit includes two NPN transistors and a series resistance circuit in which resistive elements are connected in series. The two NPN transistors respectively having collectors, bases and emitters. The collectors are respectively connected to the two paths. The bases have a common connection. The series resistance circuit is connected between a ground and one of the emitters. The voltage control circuit equalizes respective collector potentials of the two NPN transistors.

17 Claims, 6 Drawing Sheets

(56) References Cited

U.S. PATENT DOCUMENTS

| | | | | |
|---|---|---|---|---|
| 2018/0226787 | A1* | 8/2018 | Huang | G06F 1/30 |
| 2020/0218302 | A1 | 7/2020 | Brule et al. | |
| 2021/0124386 | A1* | 4/2021 | Gao | G05F 3/30 |

* cited by examiner

REFERENCE VOLTAGE GENERATION CIRCUIT

CROSS REFERENCE TO RELATED APPLICATION

This application is based on Japanese Patent Application No. 2022-141535 filed on Sep. 6, 2022, the disclosure of which is incorporated herein by reference.

TECHNICAL FIELD

The present disclosure relates to a reference voltage generation circuit.

BACKGROUND

In a circuit for generating a reference voltage, a current mirror circuit may generate a current $I_{ptat}$ whose temperature dependence is directly proportional to absolute temperature, and may subtract a voltage generated based on the generated current $I_{ptat}$ from a voltage generated by a Zener diode. The current $I_{ptat}$ depends on a junction voltage of a bipolar transistor. As a result, the temperature dependence with a direct relation in the voltage generated by the Zener diode may be corrected to acquire an output voltage being independent of the temperature.

SUMMARY

The present disclosure describes a reference voltage generation circuit for generating a reference voltage, and further describes that the reference voltage generation circuit includes a Zener diode and a current generation circuit.

DETAILED DESCRIPTION

Figure 1:
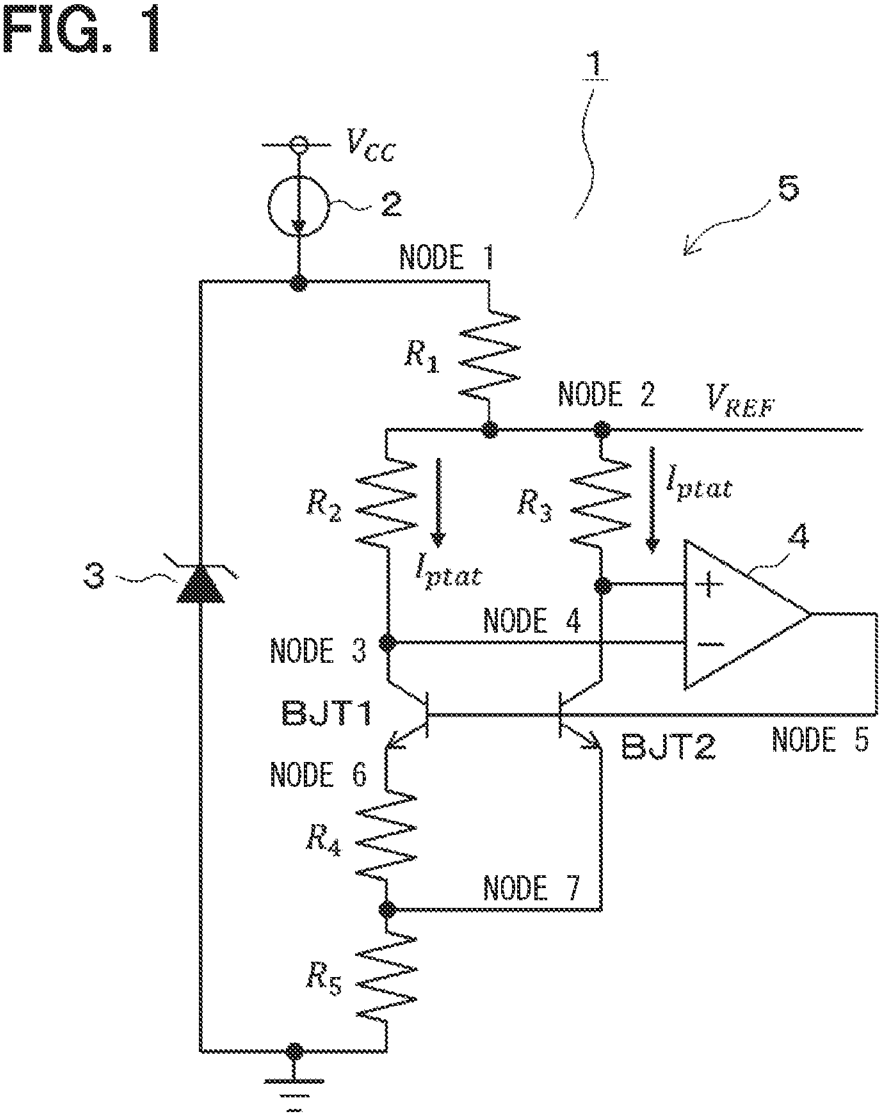
FIG. 1 is a circuit diagram that illustrates a reference voltage generation circuit according to a first embodiment.

A reference voltage generation circuit may include a current mirror circuit that generates a current $I_{ptat}$ being directly proportional to an absolute temperature. However, in the reference voltage generation circuit with the above-mentioned structure, an error may occur in the current $I_{ptat}$ generated in the current mirror circuit having a MOSFET. In other words, the ratio between the current $I_{ptat}$ and a current being the source of the mirror circuit may easily fluctuate, and the error may occur in the current $I_{ptat}$ determined by the above-mentioned ratio. Moreover, in a transistor having a relatively small ground-emitter amplification factor, since a through current from a base of the transistor is relatively large, an error corresponding to the through current may also occur in the current $I_{ptat}$.

In a case of attempting to adjust the current $I_{ptat}$, it may be difficult to implement a trimming mechanism for adjustment. For example, in the above-mentioned circuitry structure, in a case where a resistor in the circuit for generating the current $I_{ptat}$ is trimmed by a MOSFET switch, the resistor and the MOSFET switch are connected in series. Since the current flows to the MOSFET switch, the current may be affected by a resistive component included in the MOSFET switch.

According to an aspect of the present disclosure, a reference voltage generation circuit includes a Zener diode and a current generation circuit. The Zener diode is connected between a current source and a ground. The current generation circuit is connected to the Zener diode in parallel. The current generation circuit generates a current having temperature dependence directly proportional to absolute temperature. The current generation circuit includes a resistance voltage divider circuit, a transistor circuit and a voltage control circuit. The resistance voltage divider circuit outputs a voltage as a reference voltage acquired by voltage division through a resistive element. The resistance voltage divider circuit has a branch portion for branching the current into two paths.

The transistor circuit includes two NPN transistors. Respective collectors of the two NPN transistors are connected to the above-mentioned two paths. The respective bases of the two NPN transistors are being commonly connected. The series resistance circuit in which multiple resistive elements are connected in series is connected between the ground and one of emitters of the two NPN transistors. The other one of the emitters is connected to a common connection node shared by the multiple resistive elements. The voltage control circuit equalizes respective collector potentials of the above-mentioned two NPN transistors.

According to such a structure described above, the current $I_{ptat}$ having the positive temperature dependence is a current depending on the voltage difference $\Delta V_{BE}$ between the base and the emitter of each of the two NPN transistors, and the collector current flowing to a pair of transistors can be controlled with higher accuracy by the resistive voltage divider circuit and the voltage control circuit. The current $I_{ptat}$ can be adjusted by changing the resistance ratio between two paths in the resistive voltage divider circuit. Since the voltage divided by the resistive voltage divider circuit is adopted as the reference voltage, the temperature dependence of the reference voltage can be accurately corrected without adopting the current mirror circuit.

First Embodiment

As shown in FIG. 1, in a reference voltage generation circuit 1 according to the present embodiment, a series circuit, in which a current source 2 and a Zener diode 3 are connected in series, is connected between a power supply $V_{cc}$ and ground. A resistive element $R_1$ has an end connected to a cathode of the Zener diode 3, and the resistive element $R_1$ has another end connected to an end of each of the resistive elements $R_2$ and $R_3$. A common connection node between the resistive element $R_1$ and each of the resistive elements $R_2$ and $R_3$ corresponds to a branch portion. Bases of respective bipolar junction transistors (BJTs) 1 and 2 are connected in common. A collector of the BJT1 is connected to another end of the resistive element $R_2$, and a collector of the BJT2 is connected to another end of the resistive element $R_3$. The resistive element described in the present disclosure may be, for example, a resistor.

A series circuit, in which resistive elements R4 and R5 are connected in series, is connected between an emitter of the BJT1 and the ground, and an emitter of the BJT2 is connected to a common connection node between the resistive elements R4 and R5. The collector of the BJT1 is connected to an inverting input terminal of an operational amplifier 4, and the collector of the BJT2 is connected to a non-inverting input terminal of the operational amplifier 4. The operational amplifier 4 corresponds to a voltage control circuit. An output terminal of the operational amplifier is connected to the base of each of the BJTs 1 and 2.

The resistive elements $R_1$ to $R_3$ correspond to a resistance voltage divider circuit, and the series circuit, in which the resistive elements $R_4$ and $R_5$ are connected in series, corresponds to a resistance series circuit. The BJTs 1, 2 and resistance series circuits correspond to a transistor circuit. A circuitry portion connected to the Zener diode 3 in parallel forms a current generation circuit 5.

The following describes an operation in the present embodiment. Nodes 1 to 7 are defined as follows.

Node 1: cathode of Zener diode 3;

Node 2: common connection node between the resistive element $R_1$ and each of the resistive elements $R_2$ and $R_3$;

Node 3: collector code of the BJT1;

Node 4: collector node of the BJT2;

Node 5: base node of each of the BJTs 1 and 2;

Node 6: emitter of the BJT1; and

Node 7: emitter of the BJT2.

The reference voltage generation circuit 1 generates a reference voltage $V_{REF}$ and outputs the generated voltage $V_{REF}$ from the node 2. The reference voltage $V_{REF}$ is generated as described in the following. It is assumed that the resistance value of the resistive element $R_2$ is equal to the resistance value of the resistive element $R_3$; and the area ratio of the BJT1 to the BJT2 is n:1. The voltages at the respective nodes 5 to 7 are respectively indicated as $V_5$ to $V_7$. The base-emitter voltages of the BJTs 1 and 2 are respectively indicated as $V_{BE1}$ and $V_{BE2}$.

$$V_{BE1}=V_5-V_6 \quad (1)$$

$$V_{BE2}=V_5-V_7 \quad (2)$$

The potential difference $(V_6-V_7)$ associated with the resistive element R4 is given by the mathematical expression (3).

$$V_6-V_7=\Delta V_{BE1}=V_{BE2}-V_{BE1}=(k_BT/q)\log n \quad (3),$$

where $k_B$ is the Boltzmann constant; T is the absolute temperature; and q is the elementary charge.

The voltage $(V_6-V_7)$ is directly proportional to the absolute temperature. As a result, a current $I_{ptat}=\{k_BT/(qR_4)\}\log n$ directly proportional to the absolute temperature flows on the BJT1 side. Also, the voltages respectively at the nodes 3 and 4 are equalized by the operation of the operational amplifier 4. Since the resistance value of the resistive element $R_2$ is equal to the resistance value of the resistive element $R_3$, as similar to the BJT1, the current $I_{ptat}$ flows through the BJT2.

When the voltage at the node 1 is indicated as a Zener voltage $V_z$, the voltage $V_2$ at the node 2 can be expressed by the following mathematical expression (4).

$$V_2=V_{REF}=V_Z-2R_1I_{ptat}=V_Z-2R_1\{k_BT/(qR_4)\}\log n \quad (4)$$

In the mathematical expression (4), it is understood that a voltage with the cancellation of the temperature dependence of the Zener voltage $V_z$ is acquired by adjusting the temperature dependence of the current $I_{ptat}$ with the resistance ratio.

According to the present embodiment, the reference voltage generation circuit 1 includes the Zener diode 3 and the current generation circuit 5. The Zener diode 3 is connected between the current source 2 and the ground. The current generation circuit 5 is connected to the Zener diode 3 in parallel. The current generation circuit 5 has a branch portion for branching the current into two paths, and includes the resistive voltage divider circuit for outputting a voltage divided by the resistive elements $R_1$ to $R_3$, the transistor circuit, and the voltage control circuit.

The transistor circuit includes the BJT1, BJT2 and the series resistance circuit in which the resistive elements $R_4$ and $R_5$ are connected in series. The BJTs 1 and 2 are two NPN transistors whose collectors are respectively connected to the above-mentioned two paths and whose bases are commonly connected. The series resistance circuit is connected between the emitter of the BJT1 and the ground. The emitter of the BJT2 is connected to the common connection node between the resistive elements $R_4$ and $R_5$. The operational amplifier 4 controls the respective collector potentials of the transistors BJT1 and BJT2 to be equal.

According to such a structure described above, the current $I_{ptat}$ having the positive temperature dependence is a current depending on the voltage difference $\Delta V_{BE}$ between the base and the emitter of each of the two NPN transistors BJT1, BJT2, and the collector current flowing to the pair of transistors BJT1, BJT2 can be controlled with higher accuracy by the resistive voltage divider circuit and the operational amplifier 4. The current $I_{ptat}$ can be adjusted by changing the resistance ratio of two paths in the resistive voltage divider circuit. Since the voltage divided by the resistive voltage divider circuit is adopted as the reference voltage $V_{REF}$, there is no need to adopt the current mirror circuit. In other words, the temperature dependence of the reference voltage $V_{REF}$ can be accurately corrected, since an error in the resistive voltage divider circuit has no influence.

Second Embodiment

Figure 2:
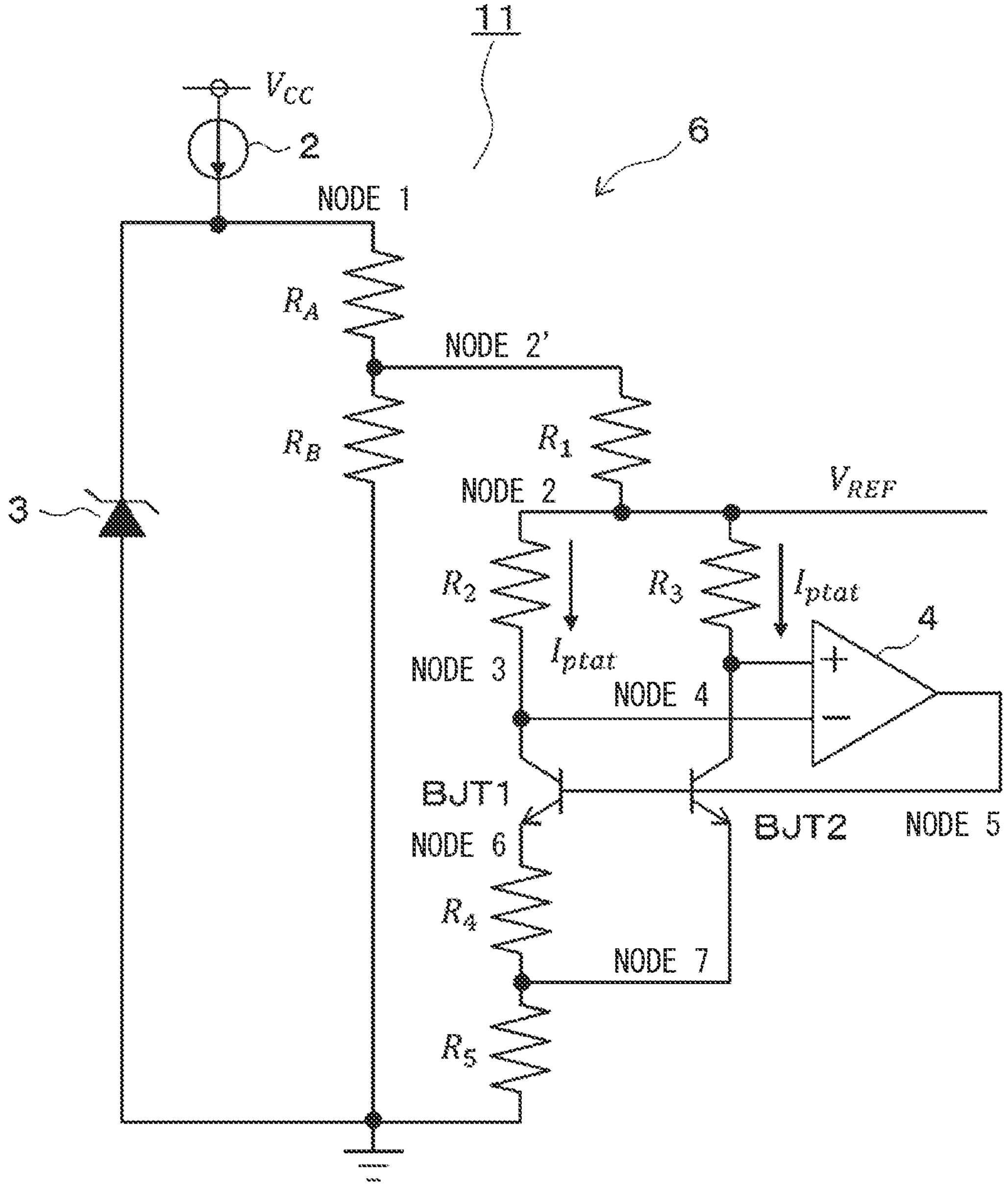
FIG. 2 is a circuit diagram that illustrates a reference voltage generation circuit according to a second embodiment.

Hereinafter, the same components as those of the first embodiment are denoted by the same reference numerals, and descriptions of the same components will be omitted, and different portions will be described. As shown in FIG. 2, in a reference voltage generation circuit 11 according to the second embodiment, a series circuit of resistive elements $R_A$ and $R_B$ is connected in parallel to the Zener diode 3. The upper end of the resistive element $R_1$ is connected to a common connection node between the resistive elements $R_A$ and $R_B$. A current generation circuit 6 is constructed by adding a structure corresponding to the current generation circuit 5 according to the first embodiment to the series circuit in which the resistive elements $R_A$ and $R_B$ are connected in series.

The following describes an operation in the second embodiment. The current $I_{ptat}$ described in the present embodiment is identical to the one described in the first embodiment. When the common connection node between the resistive elements RA and RB is regarded as the node 2', a voltage $V_2'$ at the node 2' can be expressed as the following mathematical expression (5).

$$V_2'=V_2+2R_1I_{ptat}V_2+2R_1\{k_BT/(qR_4)\}\log n \quad (5)$$

When the current flowing to the resistive element $R_A$ is indicated as I and the current flowing to the resistive element RB is indicated as I', the current I can be acquired by the mathematical expression (6).

$$I=I'+2I_{ptat} \quad (6)$$

The current I' can be acquired through the following mathematical expression (8) through the following mathematical expression (7) that indicates the terminal voltage $R_A I$ across the resistive element $R_A$.

$$R_A I=V_Z-R_B I' \quad (7)$$

$$R_A(I'+2I_{ptat})=V_Z-R_B I'$$

$$I'=(V_z-2R_A I_{ptat})/(R_A+R_B) \quad (8)$$

Since $V_2'$ is equal to $R_B I'$, the voltage $V_2'$ is acquired by the mathematical expression (9).

$$V_2'=R_B(V_Z-2R_A I_{ptat})/(R_A+R_B) \quad (9)$$

The mathematical expression (10) can be acquired by evaluating the output voltage $V_{REF}$ of the reference voltage generation circuit 11 from the mathematical expressions (5) and (9).

$$V_2=V_{REF}=R_B V_Z/(R_A+R_B)-2(R_A R_B+R_1 R_A+R_1 R_B)I_{ptat}/(R_A+R_B) \quad (10)$$

According to the second embodiment, it is possible to acquire the reference voltage $V_{REF}$ that cancels out the temperature dependence of the Zener voltage $V_z$ by adjusting the temperature dependence of the current $I_{ptat}$ through the resistance ratio in the mathematical expression (10).

Third Embodiment

Figure 3:
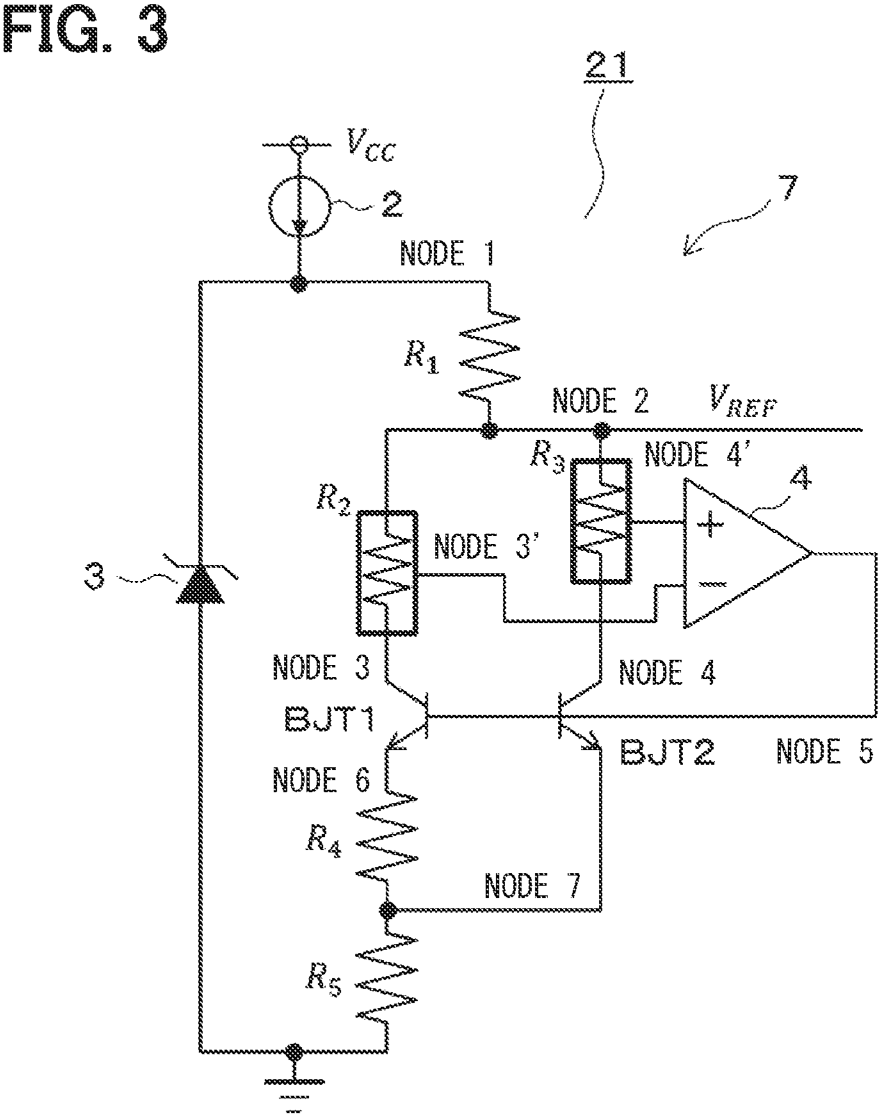
FIG. 3 is a circuit diagram that illustrates a reference voltage generation circuit according to a third embodiment.
Figure 4:
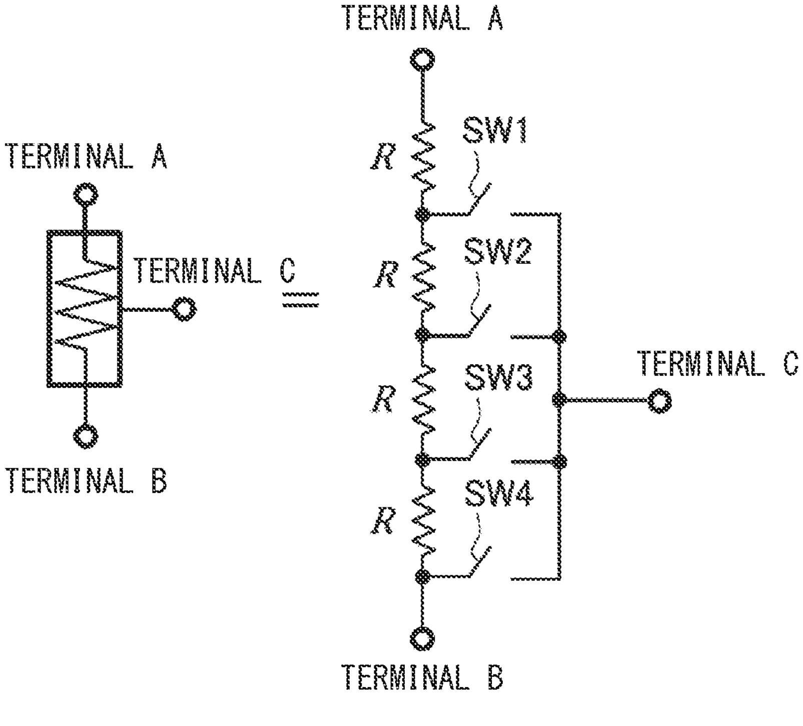
FIG. 4 illustrates the configuration of a potential adjustment circuit.

FIG. 3 illustrates a reference voltage generation circuit 21 according to a third embodiment. In the reference voltage generation circuit 21, each of the resistive elements $R_2$ and $R_3$ labelled by a box has a changeable resistance value as illustrated in FIG. 4. The upper end of each of the resistive elements $R_2$ and $R_3$ is indicated as a terminal A. The lower end of each of the resistive elements $R_2$ and $R_3$ is indicated as a terminal B. Each of the nodes 3' and 4' connected to the input terminal of the operational amplifier 4 is indicated as a terminal C. For example, four resistive elements R are connected in series, and each of four switches SW1 to SW4 is connected between the terminal C and the terminal B and between the terminal C and a corresponding common connection node between the resistive elements. These switches SW1 to SW4 are, for example, MOSFETs. The resistive element $R_1$ and the switches SW1 to SW4 correspond to a potential adjustment circuit. A circuitry portion connected to the Zener diode 3 in parallel forms a current generation circuit 7.

Next, an operation of the third embodiment will be described. The base-emitter voltage of the BJT1 is indicated as $V_{BE1}$ in the following mathematical expression (11), and the base-emitter voltage of the BJT2 is indicated as $V_{BE2}$ in the following mathematical expression (12).

$$V_{BE1}=V_5-V_6 \quad (11)$$

$$V_{BE2}=V_5-V_7 \quad (12)$$

The potential difference $(V_6-V_7)$ as a terminal voltage across the resistive element $R_4$ is acquired by the following mathematical expression (13). The collector current of the BJT1 is indicated as $I_{C1}$, and the collector current of the BJT2 is indicated as $I_{C2}$.

$$V_6-V_7=\Delta V_{BE}=V_{BE2}-V_{BE1}=k_B T/q\{\log n+\log(I_{C2}/I_{C1})\} \quad (13)$$

The collector current $I_{C1}$ is acquired by the following mathematical expression (14).

$$I_{C1}=k_B T/(qR_4)\{\log n+\log(I_{C2}/I_{C1})\} \quad (14)$$

Since the voltage at the node 3' and the voltage at the node 4' are equal through the operation of the operational amplifier 4, the potential difference between the node 2 and the node 3' and the potential between the node 2 and the node 4' are equal. By changing the weighting of each of the resistive elements $R_2$ and $R_3$, the resistance value between the node 2 and the node 3' is adjusted to $R_2'$ and the resistance value between the node 2 and the node 4' is adjusted to $R_3'$. Thus, the collector current $I_{C2}$ flowing to the transistor BJT2 is acquired by the following mathematical expression (15).

$$I_{C2}=(R2'/R3')I_{C1} \quad (15)$$

Since the voltage at the node 1 is the Zener voltage $V_Z$, the following mathematical expression (16) is derived by evaluating the voltage $V_2$ at the node 2, in other words, the output voltage $V_{REF}$ of the reference voltage generation circuit 21.

$$V_2=V_{REF}=V_Z-R_1(I_{C1}+I_{C2})=V_Z-k_B T R_1/(qR_4)(1+R_2'/R_3')\times\{\log n+\log(R_2'/R_3')\} \quad (16)$$

According to the third embodiment, by adjusting the temperature dependence on the current $I_{ptat}$ through the resistance ratio $(R_1/R_4)$, it is possible to cancel out the temperature dependence on the Zener voltage $V_Z$. It is possible to correct the influence of variation in the current $I_{ptat}$ by adjusting the resistance ratio $(R_2'/R_3')$ through changing the weighting of the resistive elements $R_2$ and $R_3$.

Fourth and Fifth Embodiments

Figure 5:
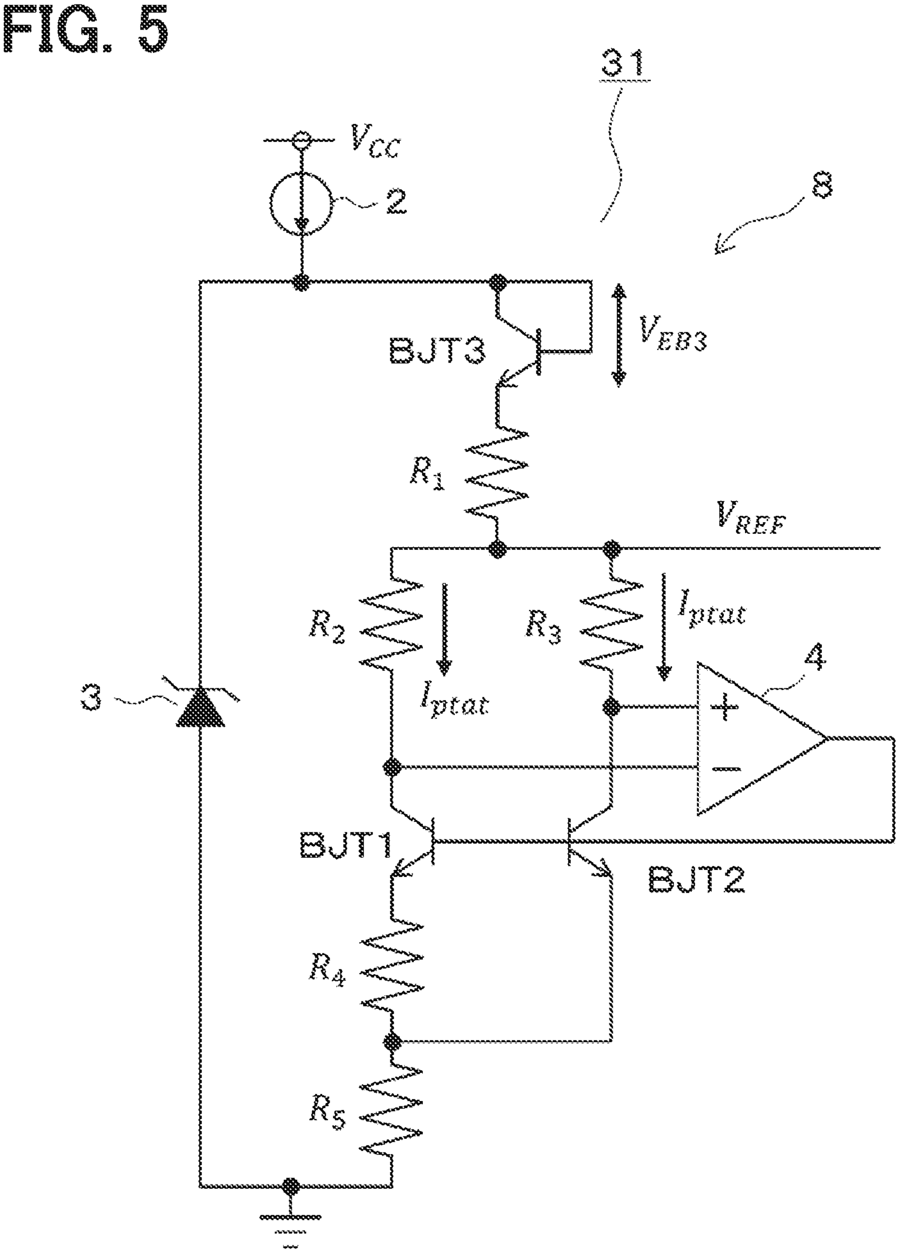
FIG. 5 is a circuit diagram that illustrates a reference voltage generation circuit according to a fourth embodiment.

FIG. 5 illustrates a reference voltage generation circuit 31 according to a fourth embodiment. In the reference voltage generation circuit 31, a diode-connected NPN transistor BJT3 is connected between the current source 2 and the resistive element $R_1$ in the reference voltage generation circuit 1 according to the first embodiment. A circuitry portion connected to the Zener diode 3 forms a current generation circuit 8.

Figure 6:
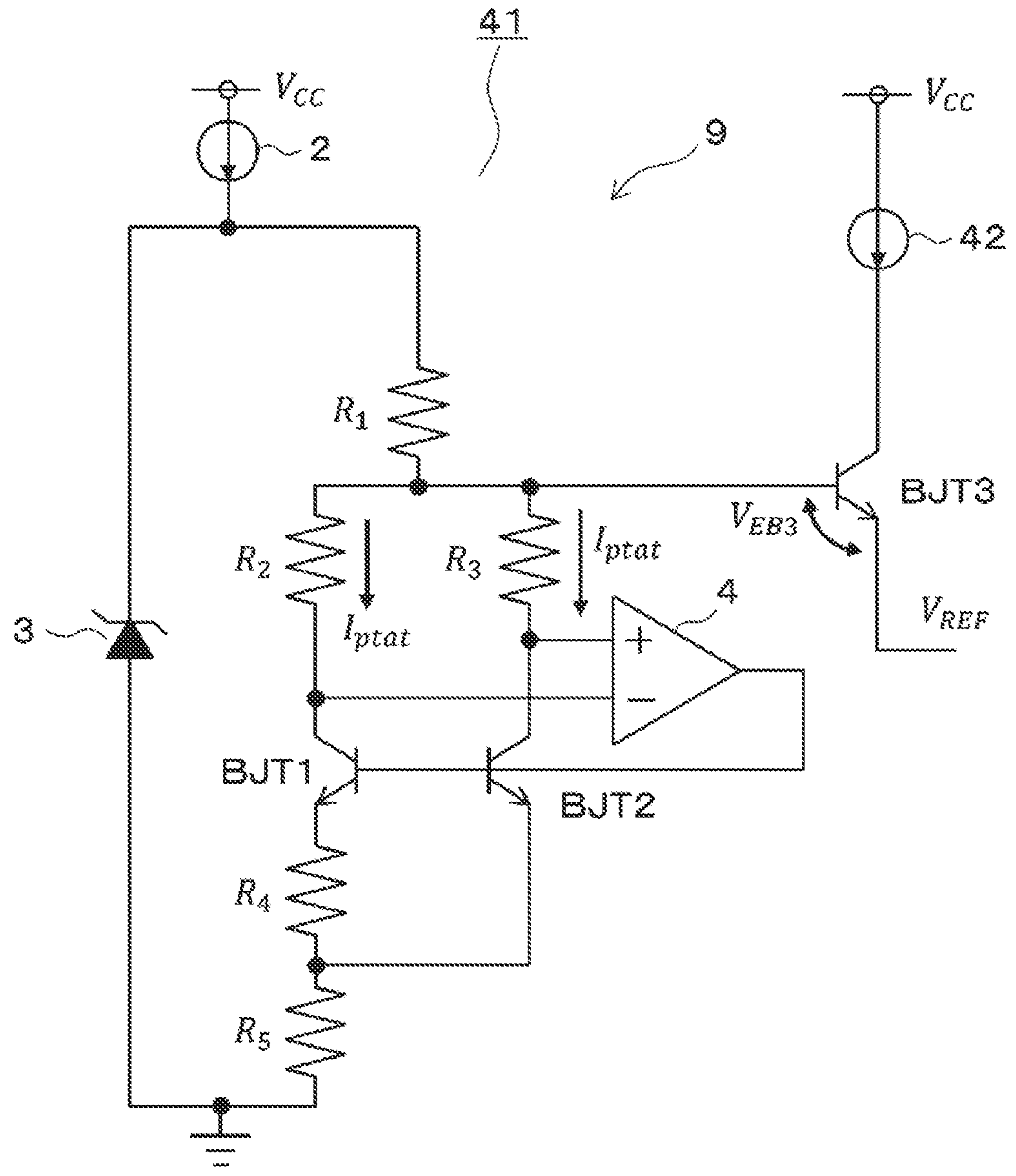
FIG. 6 is a circuit diagram that illustrates a reference voltage generation circuit according to a fifth embodiment.

FIG. 6 illustrates a reference voltage generation circuit 41 that connects the base of the transistor BJT3 to the node 2 in the reference voltage generation circuit 1 according to the first embodiment. A current source 42 that is similar to the current source 2 is connected to the collector of the transistor BJT3, the voltage $V_{REF}$ is output from the emitter of the transistor BJT3. A circuitry portion connected to the Zener diode 3 in parallel forms a current generation circuit 9.

The following describes the operation of each of the fourth and fifth embodiments. In the following, the base-emitter voltage of the transistor BJT3 is indicated as $V_{BE3}$. For the output voltage $V_{REF}$ of each of the reference voltage generation circuits 31 and 41, the Zener voltage $V_Z$ described in the first embodiment may be replaced with $(V_Z-V_{BE3})$.

$$V_{REF}=(V_Z-V_{BE3})-2R_1\{k_B T/(qR_4)\}\log n \quad (17)$$

In the mathematical expression (17), by adjusting the temperature dependence of the current $I_{ptat}$ with the resistance ratio, the temperature dependence of the voltage $(V_Z-V_{BE3})$ can be cancelled out. In the mathematical expression (17), stress dependence of the voltage $V_{REF}$ is represented by the following mathematical expression (18).

$$\frac{\partial V_{REF}}{\partial \sigma} = \frac{\partial V_Z}{\partial \sigma} - \frac{\partial V_C}{\partial \sigma} \tag{18}$$

In the mathematical expression (18), it is possible to cancel out the stress dependence of the $V_{REF}$, by selecting the stress dependence of the voltage $V_{BE3}$ of a non-linear element that is similar to the stress dependence of the voltage $V_z$ between the cathode and anode of the Zener diode 3.

Other Embodiments

The switch circuit is not limited to MOSFET. The number of resistive elements and switch circuits included in the potential adjustment circuit may be appropriately modified according to an individual design. The configuration according to the third embodiment in which the resistance value may be modified may also be applied to the fourth and fifth embodiments. Although the present disclosure has been described in accordance with the embodiments, it is understood that the present disclosure is not limited to such embodiments and structures. The present disclosure encompasses various modifications and variations within the scope of equivalents. Furthermore, various combination and formation, and other combination and formation including one, more than one or less than one element may be made in the present disclosure.

What is claimed is:

1. A reference voltage generation circuit comprising:
- a current source;
- a Zener diode connected between the current source and a ground; and
- a current generation circuit connected to the Zener diode in parallel, the current generation circuit configured to generate a current having temperature dependence being directly proportional to absolute temperature, wherein the current generation circuit includes:
- a resistance voltage divider circuit including a branch circuit having
  - a branch portion for branching the current into two paths, and
  - a resistive element connected between the Zener diode and the branch portion,
  - the resistance voltage divider circuit configured to output from the branch portion a reference voltage acquired by a voltage division of the branch circuit;
- a transistor circuit having two NPN transistors and a series resistance circuit in which a plurality of resistive elements are connected in series, respective collectors of the two NPN transistors being connected to the two paths, respective bases of the two NPN transistors being commonly connected, the series resistance circuit being connected between the ground and one of emitters of the two NPN transistors, another one of the emitters being connected to a common connection node shared by the plurality of resistive elements; and
- a voltage control circuit configured to equalize respective collector potentials of the two NPN transistors.

2. The reference voltage generation circuit according to claim 1, wherein
- the voltage control circuit includes an operational amplifier having:
  - two input terminals separately connected to the respective collectors included in the transistor circuit; and
  - an output terminal connected to the bases included in the transistor circuit.

3. The reference voltage generation circuit according to claim 1, wherein
- the resistance voltage divider circuit includes a second series resistance circuit in which a second plurality of resistive elements are connected in series,
- the second series resistance circuit included in the resistance voltage divider circuit is connected to the Zener diode in parallel, and
- the branch portion branches the current into the two paths from a second common connection node shared by the second plurality of resistive elements of the second series resistance circuit.

4. The reference voltage generation circuit according to claim 1, wherein
- the resistance voltage divider circuit includes a potential adjustment circuit configured to adjust the respective collector potentials of the two NPN transistors in the transistor circuit.

5. The reference voltage generation circuit according to claim 4, wherein
- the potential adjustment circuit includes:
  - a second series resistance circuit in which a second plurality of resistive elements are connected in series; and
  - a plurality of switch circuits having first terminals and second terminals, the first terminals being commonly connected, the second terminals being separately connected to terminals in the second series resistance circuit.

6. The reference voltage generation circuit according to claim 1, further comprising:
- a semiconductor element having a PN junction, the semiconductor element located at a path between the current source and a terminal for outputting the reference voltage generated by the current generation circuit.

7. The reference voltage generation circuit according to claim 6, wherein
- the semiconductor element is connected between the current source and the resistance voltage divider circuit included in the current generation circuit.

8. The reference voltage generation circuit according to claim 6, further comprising:
- an additional current source, wherein
- the semiconductor element is an NPN transistor including
  - a base connected to a branch node of the branch portion,
  - an emitter outputting the reference voltage, and
  - a collector connected to the additional current source.

9. The reference voltage generation circuit according to claim 7, wherein
- the resistance voltage divider circuit includes a potential adjustment circuit configured to adjust the respective collector potentials of the two NPN transistors in the transistor circuit.

10. The reference voltage generation circuit according to claim 9, wherein
- the potential adjustment circuit includes:
  - a second series resistance circuit in which a second plurality of resistive elements are connected in series; and
  - a plurality of switch circuits having first terminals and second terminals, the first terminals being commonly connected, the second terminals being separately connected to terminals in the second series resistance circuit.

11. The reference voltage generation circuit according to claim 8, wherein the resistance voltage divider circuit includes a potential adjustment circuit configured to adjust the respective collector potentials of the two NPN transistors in the transistor circuit.

12. The reference voltage generation circuit according to claim 11, wherein the potential adjustment circuit includes:

a second series resistance circuit in which a second plurality of resistive elements are connected in series; and a plurality of switch circuits having first terminals and second terminals, the first terminals being commonly connected, the second terminals being separately connected to terminals in the second series resistance circuit.

13. The reference voltage generation circuit according to claim 1, wherein the resistance voltage divider circuit is configured to output the reference voltage from the branch portion, without interposing an additional circuit component disposed between the branch portion and an output node of the resistance voltage divider circuit.

14. The reference voltage generation circuit according to claim 1, wherein each of the two paths includes a branch resistive element, and at least one branch resistive element in the two paths includes a potential adjustment circuit configured to adjust the respective collector potentials of the two NPN transistors in the transistor circuit.

15. A reference voltage generation circuit comprising:

a current source;

a Zener diode connected between the current source and a ground; and a current generation circuit connected to the Zener diode in parallel, the current generation circuit configured to generate a current having temperature dependence being directly proportional to absolute temperature, wherein:

the current generation circuit includes:

a resistance voltage divider circuit having a branch portion for branching the current into two paths, the resistance voltage divider circuit configured to output a reference voltage acquired by voltage division through a resistive element;

a transistor circuit having two NPN transistors and a series resistance circuit in which a plurality of resistive elements are connected in series, respective collectors of the two NPN transistors being connected to the two paths, respective bases of the two NPN transistors being commonly connected, the series resistance circuit being connected between the ground and one of emitters of the two NPN transistors, another one of the emitters being connected to a common connection node shared by the plurality of resistive elements; and a voltage control circuit configured to equalize respective collector potentials of the two NPN transistors; and the reference voltage generation circuit further comprises:

a semiconductor element having a PN junction, the semiconductor element located at a path between the current source and a terminal for outputting the reference voltage generated by the current generation circuit; and an additional current source, wherein the semiconductor element is an NPN transistor including a base connected to a branch node of the branch portion, an emitter outputting the reference voltage, and a collector connected to the additional current source.

16. The reference voltage generation circuit according to claim 15, wherein the resistance voltage divider circuit includes a potential adjustment circuit configured to adjust the respective collector potentials of the two NPN transistors in the transistor circuit.

17. The reference voltage generation circuit according to claim 16, wherein the potential adjustment circuit includes:

a second series resistance circuit in which a second plurality of resistive elements are connected in series; and a plurality of switch circuits having first terminals and second terminals, the first terminals being commonly connected, the second terminals being separately connected to terminals in the second series resistance circuit.

* * * * *